US011236212B2

(12) United States Patent
Weisse et al.

(10) Patent No.: US 11,236,212 B2
(45) Date of Patent: Feb. 1, 2022

(54) PHYLLOSILICATE-IMPREGNATED MELAMINE-FORMALDEHYDE FOAM

(71) Applicant: BASF SE, Ludwigshafen am Rhein (DE)

(72) Inventors: Sebastian Alexander Weisse, Ludwigshafen am Rhein (DE); Tobias Heinz Steinke, Ludwigshafen am Rhein (DE); Bernhard Vath, Ludwigshafen am Rhein (DE); Werner Lenz, Ludwigshafen am Rhein (DE)

(73) Assignee: BASF SE, Ludwigshafen am Rhein (DE)

(*) Notice: Subject to any disclaimer, the term of this patent is extended or adjusted under 35 U.S.C. 154(b) by 27 days.

(21) Appl. No.: 16/646,643

(22) PCT Filed: Aug. 30, 2018

(86) PCT No.: PCT/EP2018/073333
§ 371 (c)(1),
(2) Date: Mar. 12, 2020

(87) PCT Pub. No.: WO2019/052825
PCT Pub. Date: Mar. 21, 2019

(65) Prior Publication Data
US 2020/0270415 A1 Aug. 27, 2020

(30) Foreign Application Priority Data
Sep. 12, 2017 (EP) .................... 17190519

(51) Int. Cl.
C08J 9/40 (2006.01)
C08J 9/00 (2006.01)
C08K 9/06 (2006.01)

(52) U.S. Cl.
CPC ............... C08J 9/40 (2013.01); C08J 9/009 (2013.01); C08J 9/0066 (2013.01); C08J 9/0095 (2013.01); C08K 9/06 (2013.01); C08J 2201/038 (2013.01); C08J 2205/05 (2013.01); C08J 2361/28 (2013.01); C08J 2475/04 (2013.01)

(58) Field of Classification Search
CPC ... C08J 9/40; C08J 9/0066; C08J 9/009; C08J 9/0095; C08J 2201/038; C08J 2205/05; C08J 2361/28; C08J 2475/04; C08J 9/0004; C08K 9/06; B29C 44/5618
See application file for complete search history.

(56) References Cited

U.S. PATENT DOCUMENTS

| 4,511,678 A | 4/1985 | Mahnke et al. |
| 4,992,481 A * | 2/1991 | von Bonin ............ C09K 3/1021 521/54 |
| 6,395,824 B1 | 5/2002 | Beutler et al. |
| 8,546,457 B2 | 10/2013 | Alteheld et al. |
| 2008/0280126 A1 | 11/2008 | Lenz et al. |
| 2009/0005466 A1 * | 1/2009 | Baumgartl ................ C08J 9/42 521/136 |
| 2019/0276623 A1 | 9/2019 | Szeifert et al. |

FOREIGN PATENT DOCUMENTS

| DE | 19733044 A1 | 2/1999 | |
| EP | 0017672 B1 | 4/1983 | |
| EP | 0451535 A1 * | 10/1991 | ............ B32B 38/08 |
| ER | 0332928 A2 | 9/1989 | |
| JP | 2003022076 A | 1/2003 | |
| WO | WO-2007023118 A2 | 3/2007 | |
| WO | WO-2009021963 A1 | 2/2009 | |
| WO | WO-2012059493 A1 * | 5/2012 | ............ C09K 21/02 |

OTHER PUBLICATIONS

International Preliminary Examination Report for PCT/EP2018/073333 dated Jul. 25, 2019 with Applicant amended claims.
International Search Report for PCT/EP2018/073333 dated Sep. 25, 2018.

* cited by examiner

Primary Examiner — Kara B Boyle
(74) Attorney, Agent, or Firm — Faegre Drinker Biddle & Reath LLP

(57) ABSTRACT

A melamine/formaldehyde foam having an open-cell foam structure, with an impregnation applied to the foam structure that comprises at least one particulate phyllosilicate surface-modified with aminosilane and at least one anionically- and/or nonionically-stabilized polyurethane dispersion.

14 Claims, No Drawings

PHYLLOSILICATE-IMPREGNATED MELAMINE-FORMALDEHYDE FOAM

CROSS-REFERENCE TO RELATED APPLICATIONS

This application is a national stage application (under 35 U.S.C. § 371) of PCT/EP2018/073333, filed Aug. 30, 2018, which claims benefit of European Application No. 17190519.3, filed Sep. 12, 2017, both of which are incorporated herein by reference in their entirety.

The invention relates to a melamine/formaldehyde foam impregnated with phyllosilicate, to a process for the production thereof, and to the use thereof.

The production of fire-retardant open-cell melamine/formaldehyde foams that comprise inorganic fillers is known from the prior art.

WO 2007/023118 relates to a foam consisting of a foam matrix having substantially open cells and having applied to the foam matrix an impregnation consisting substantially of fluorocarbon resin and/or silicone resin, with the impregnation additionally comprising at least one flame-retardant substance. The flame-retardant substance is preferably sodium silicate (water glass), which is used in the form of an adhesive comprising 30% by weight of sodium silicate.

WO 2012/059493 relates to melamine/formaldehyde foams that comprise 80 to 98% by weight of an inorganic filler. Various particulate materials are mentioned as inorganic fillers, including phyllosilicates. The inorganic fillers can be used uncoated or coated. They are produced by foaming and drying melamine/formaldehyde precondensates in a solvent with an acid, a dispersant, a blowing agent, and the inorganic filler. This results in the inorganic fillers becoming embedded in, and filling, the pore structure of the foam, i.e. the average particle diameter of the inorganic fillers corresponds to the average pore diameter of the foam structure.

JP-A-2003022076 relates to flame-retardant acoustic materials based on a melamine resin. A surface layer based on inorganic hydrates of borax or sodium silicate is applied to the melamine resin foam. The foams exhibit good sound-absorption properties allied with improved fire behavior.

The known flame-retardant melamine/formaldehyde foams treated with sodium silicate (water glass) often have low breaking strength, with the result that mechanical stress leads to the water glass impregnation becoming readily detached from the foam and lost in the form of dust.

Furthermore, not all melamine/formaldehyde foams exhibit adequate fire-protection behavior. In shipbuilding in particular, insulation materials used for the construction of partitions must meet the test criterion "non-combustibility" as defined by the guidelines of the International Maritime Organization (IMO). The non-combustibility test and classification are carried out in accordance with the International Codes for Application of Fire Test Procedures (FTPC): IMO 2010 FTP code part 1 (resolution MSC.307(88)). In this furnace test according to DIN EN ISO 1182, the foams tested must not lose more than 50% by weight of their weight when burned. In addition, the furnace temperature and the surface temperature of the test specimen must not rise by more than 30° C., and the flame duration must be below 10 seconds. These criteria are not met by standard melamine/formaldehyde foams.

The object of the present invention is to provide flame-retardant melamine/formaldehyde foams that avoid the disadvantages of the known foams and combine good mechanical properties with advantageous fire behavior. In particular, the fire-protection material should adhere to the foam sufficiently well that the fire-protection material does not detach and escape from the foam even when subjected to mechanical stress. In addition, the IMO 2010 FTP code 1 fire test should particularly preferably be passed.

The object is achieved according to the invention by a melamine/formaldehyde foam having an open-cell foam structure, with an impregnation applied to the foam structure that comprises at least one particulate phyllosilicate surface-modified with aminosilane and at least one anionically- and/or nonionically-stabilized polyurethane dispersion.

A preferred foam has the feature that its outer surface is at least partially laminated with flat, non-flammable materials, preferably glass-fiber nonwovens, mineral-fiber nonwovens, glass-fiber woven fabrics, mineral-fiber woven fabrics or metal foils such as aluminum foil.

It was found in accordance with the invention that impregnation of a melamine/formaldehyde foam results both in an impregnated foam having adequate mechanical stability and in the fire test according to IMO 2010 FTP code 1 being passed, if a specific particulate phyllosilicate is combined with a specific polyurethane dispersion as a binder.

The term "impregnation" describes the substances applied to the foam structure, in the present case the applied phyllosilicate and the applied polyurethane dispersion and also any optionally applied dispersing agents and hydrophobizing/oleophobizing agents. The term "impregnation" also encompasses the dried applied substances.

The object is also achieved according to the invention by a process for producing such a melamine/formaldehyde foam, comprising the following steps:

(a) mixing the at least one particulate phyllosilicate surface-modified with aminosilane with the at least one anionically- and/or nonionically-stabilized polyurethane dispersion, (b) applying the mixture from step (a) to the foam, (c) optionally subsequently compressing the foam so as to introduce the mixture into the pores of the foam, (d) drying the foam.

The object is further achieved by the use of such melamine/formaldehyde foams for thermal and sound insulation in the construction of buildings, in automobile, ship, and rail vehicle construction, the construction of spacecraft or in the upholstery industry.

According to the invention, a particulate phyllosilicate surface-modified with aminosilane is used to impregnate the melamine/formaldehyde foam.

Suitable phyllosilicates are silicates whose silicate anions consist of layers of corner-linked $SiO_4$ tetrahedra. These layers or double layers are not interlinked to form three-dimensional silicate structures via further S; bonds Suitable phyllosilicates are known to those skilled in the art. Preference is given to the phyllosilicates montmorillonite (smectite) $(Al,Mg,Fe)_2[(OH)_2|(Si,Al)_4O_{10}]$ $Na_{0.33}(H_2O)_4$, vermiculite $Mg_2(Al,Fe,Mg)[(OH)_2|(Si,Al)_4O_{10}]\cdot Mg_{0.35}(H_2O)_4$, allophane $Al_2[SiO_5]_6O_3\cdot nH_2O$, kaolinite $Al_4[(OH)_8|Si_4O_{10}]$, halloysite $Al_4[(OH)_8|Si_4O_{10}]\cdot 2H_2O$, mullite $Al_8[(O, OH, F)|(Si,Al)O_4]_4$, talc $Mg_3Si_4O_{10}(OH)_2$. Particular preference is given to using kaolinite as the phyllosilicate.

The phyllosilicates preferably have an average particle diameter in the range from 0.2 to 10 µm, more preferably from 0.5 to 5 µm, in particular 1 to 2 µm. The average particle diameter here can be the Z average, determined by light scattering, Malvern, Fraunhofer diffraction. The average particle diameter is preferably the average length d of the particle diameter.

The particulate phyllosilicates employed according to the invention are surface-modified with aminosilane. This improves the dispersibility in the polyurethane dispersion that is used as binder. In addition, the aminosilane surface modification allows chemical binding to the polyurethane binder and to the melamine-formaldehyde foam.

Any aminosilanes could be used for surface modification here. Suitable silane compounds are in particular those of the general formula

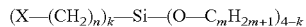

in which the substituents are defined as follows:
X $NH_2$-
n an integer from 2 to 10, preferably from 3 to 4
m an integer from 1 to 5, preferably from 1 to 2
k an integer from 1 to 3, preferably 1, Examples of suitable aminosilanes are bis(3-triethoxysilylpropyl)amine, 3-aminopropylmethyldiethoxysilane, 3-aminopropyltrimethoxysilane. Typical aminosilanes thus have a $C_{2-6}$ alkylamine radical on the silicon atom of the silane radical. The amount of aminosilane for surface modification can be freely chosen according to requirements in the individual case.

Preferred silane compounds are aminopropyltrimethoxysilane, aminobutyltrimethoxysilane, aminopropyltriethoxysilane, aminobutyltriethoxysilane. The silane compounds are generally used for surface coating in amounts of 0.05% to 5%, preferably 0.1% to 1.5%, and in particular 0.2% to 0.5% by weight (based on the phyllosilicate).

Suitable particulate phyllosilicates that are surface-modified with aminosilane are commercially available, for example under the name Translink® 445 from BASF SE.

A suitable surface-modified particulate phyllosilicate that is preferred according to the invention is Translink® 445 from BASF SE. It is a kaolin surface-modified with aminosilane and has an average particle size of about 1.4 μm based on particle length.

The at least one particulate phyllosilicate surface-modified with aminosilane is applied to the foam structure in an amount of 50 to 350, preferably 75 to 300, in particular 100 to 250, parts by weight, based on 100 parts by weight of unimpregnated melamine/formaldehyde foam.

The polyurethane dispersion that is used as a binder for the particulate phyllosilicates is anionically and/or nonionically stabilized. This averages that the polyurethane dispersion is compatible with polycations. Suitable polyurethane dispersions are preferably stabilized with sulfonates or carboxylates having alkali metal or ammonium counterions. Suitable polyurethane dispersions are known to those skilled in the art. These polyurethane dispersions are usually aqueous.

The at least one polyurethane dispersion is preferably an aqueous dispersion of a polyurethane comprising carbodiimide structural units of the formula —N=C=N—. The carbodiimide structural units of the formula —N=C=N— are particularly preferably introduced into the polyurethane via tetramethylxylylene diisocyanate (TMXDI).

The content of carbodiimide structural units of the formula —N=C=N— is preferably 5 to 200 ml/kg based on the polyurethane.

Suitable aqueous polyurethane dispersions are described for example in DE-A-197 33 044.

The carbodiimide structural units can be particularly easily incorporated into the aqueous polyurethane dispersion by using isocyanates of the general formula OCN—(R—N=C=N)$_m$—R—NCO for constructing the polyurethanes, where R is a divalent hydrocarbon radical optionally containing urethane, ester and/or ether groups such as is obtained by removing the isocyanate groups from a simple organic isocyanate or from a prepolymer containing urethane groups and optionally ether or ester groups and bearing terminal isocyanate groups, wherein, if more than one radical R is present in the same molecule, there may at the same time also be different radicals R corresponding to the specified definition, and wherein m is an integer or (on statistical average) a non-integer number from 1 to 10, preferably from 1 to 4.

The radicals R are preferably derived by abstraction of isocyanate groups from monomers, which are diisocyanates commonly used in polyurethane chemistry.

Suitable monomers are mentioned in DE-A-197 33 044 on page 2, lines 48 to 67.

The polyurethane dispersions used according to the invention contain the carbodiimide structural units particularly preferably in amounts of 5 to 150 mmol/kg polyurethane, most preferably in amounts of 100 to 100 mmol/kg polyurethane.

The polyurethane dispersion used according to the invention preferably has a solids content of 10% to 75% by weight, more preferably 20% to 65% by weight, and a viscosity of 10 to 500 Pas. In particular, it is an aqueous dispersion.

Examples of suitable polyurethane dispersions are described in examples 1 and 2 of DE-A-197 33 044.

The aqueous dispersions may be constructed, for example, from:
a) diisocyanates that
  a1) contain carbodiimide structural units of the formula —N=C=N— and optionally ones
  a2) that are free of structural units of the formula —N=C=N—,
b) diols, of which
  b1) 10 to 100 mol %, based on the total amount of diols (b), have a molecular weight of 500 to 5000, and
  b2) 0 to 90 mol %, based on the total amount of diols (b), have a molecular weight of 60 to 500 g/mol,
c) monomers different from monomers (a) and (b) and having at least one isocyanate group or at least one isocyanate-reactive group which additionally bear at least one hydrophilic group or a potentially hydrophilic group, which make the polyurethanes dispersible in water.
d) optionally further polyfunctional compounds different from monomers (a) to (c) and having reactive groups that are alcoholic hydroxyl groups, primary or secondary amino groups or isocyanate groups, and
e) optionally monofunctional compounds different from monomers (a) to (d) and having a reactive group that is an alcoholic hydroxyl group, a primary or secondary amino group or an isocyanate group.

The diols (b) are preferably polyesterols
The anionic and/or nonionic stabilization of the polyurethane dispersion has the effect of making the polyurethane dispersion compatible with polycations.

The anionic and/or nonionic stabilization is preferably achieved by adding carboxylates or sulfonates having ammonium or alkali metal counterions to the PU dispersions in an amount sufficient for stabilization.

Examples of suitable polyurethane emulsions are Emuldur® A series products from BASF SE, for example Emuldur® 360A. This is a dispersion of a polyurethane containing carbodiimide groups such as is described in DE-A-197 33 044. The polyurethane contains TMXDI groups.

Other suitable polyurethane dispersions are Emuldur® 381 A, Astacin® Finish PUM TF, and Astacin® Finish PUMN TF from BASF SE. These are anionic aliphatic polyurethane dispersions.

Another suitable dispersion is Impranil® DLV/1 from Covestro. This is an anionic aliphatic polycarbonate ester-polyether-polyurethane dispersion.

All the above dispersions are typically used in a solids concentration of approximately 40% by weight.

The at least one polyurethane dispersion is preferably used in an amount of 0.5% to 10% by weight, more preferably 1% to 5% by weight, in particular 2% to 4% by weight, based on the impregnation dry mass. The quantities stated are thus based on the total solids contents of surface-modified particulate phyllosilicate and polyurethane dispersion.

According to one embodiment of the invention, it is further advantageous to additionally use a dispersing agent. For example, talc may be used as a dispersing agent. Talc may be additionally used preferably in an amount of 1% to 20% by weight, more preferably 5% to 15% by weight, in particular 7.5% to 12.5% by weight, based on the amount of particulate phyllosilicate surface-modified with aminosilane.

In another embodiment, it is possible to additionally use fluorocarbon resins or silicone resins in order to make the foam hydrophobic and/or oleophobic. This prevents the foam from becoming completely saturated with liquid water or oil. In commercial impregnating agents, the fluorocarbon resin or silicone resin is preferably in the form of emulsified droplets in water or volatile organic solvents, for example methanol, ethanol, acetone or pentane. For reasons of non-combustibility and occupational safety, water is preferred as an emulsifier.

A suitable impregnation agent is Tegosivin HE 328 from Evonik. Tegosivin HE 328 is a solvent-free, aqueous emulsion based on modified reactive siloxanes and silanes. A suitable impregnation agent based on fluorocarbon resins is Lefasol VO 37/2 from Lefatex Chemie GmbH. The impregnating agent may be additionally used preferably in an amount of 0.1% to 10% by weight, more preferably 0.5% to 5% by weight, in particular 0.75% to 2.5% by weight, based on the amount of particulate phyllosilicate surface-modified with aminosilane.

The at least one particulate phyllosilicate surface-modified with aminosilane and the at least one anionically- and/or nonionically-stabilized polyurethane dispersion and optionally the dispersing agent and the hydrophobizing/oleophobizing agent are applied to the foam structure of a melamine/formaldehyde foam having an open-cell foam structure.

Melamine/formaldehyde foams that are suitable according to the invention are described for example in WO 2007/023118, EP-B-0 071 672, and WO 2012/059493.

Suitable foams in the context of the present invention are those in which the foam matrix is formed from a melamine/formaldehyde polycondensate. In a particularly preferred melamine/formaldehyde polycondensate, the molar ratio of formaldehyde to melamine is 5:1 to 1.3:1, preferably 3.5:1 to 1.5:1.

Such melamine/formaldehyde foams are disclosed for example in EP-B 0 071 672 and are commercially available from BASF SE under the trade name Basotect®. The open-cell foams are here produced by foaming an aqueous solution of a melamine/formaldehyde condensation product, the solution comprising an emulsifier, an acidic curing agent, and a blowing agent, preferably a $C_5$ to $C_7$ hydrocarbon. The melamine/formaldehyde condensate is then cured at elevated temperature. The term open-cell refers to foams in which the foam structure essentially consists of a large number of interconnected, three-dimensionally branched cell webs. The bulk density of the open-cell foam is generally in the range from 4 to 12 g/l, preferably in the range from 5 to 7 g/l. The pore size is 10 to 1000 μm, preferably 50 to 300 μm.

The pore size may be, for example, the number-average $d_{50}$ value, determined by light or electron microscopy in conjunction with image analysis.

In addition to melamine, the melamine/formaldehyde condensation products may comprise 0% to 50% by weight, preferably 0% to 40% by weight, more preferably 0% to 30% by weight, in particular 0% to 20% by weight, of other thermoset formers and, in addition to formaldehyde, may comprise 0% to 50% by weight, preferably 0% to 40% by weight, more preferably 0% to 30% by weight, in particular 0% to 20% by weight, of other aldehydes incorporated through condensation. Preference is given to unmodified melamine-formaldehyde precondensates.

Examples of suitable thermoset formers include alkyl- and aryl-substituted melamine, urea, urethanes, carboxamides, dicyandiamide, guanidine, sulfamide, sulfonamides, aliphatic amines, glycols, phenol or derivatives thereof.

Examples of suitable aldehydes include acetaldehyde, trimethylolacetaldehyde, acrolein, benzaldehyde, furfural, glyoxal, glutaraldehyde, phthalaldehyde, terephthalaldehyde or mixtures thereof. Further details on melamine/formaldehyde condensation products are given in Houben-Weyl, Methoden der organischen Chemie, volume 14/2, 1963, pages 319 to 402.

The melamine/formaldehyde foams used in accordance with the present invention can be produced as follows:

Melamine-formaldehyde precondensate and a solvent may be foamed with an acid, a dispersant, and with a blowing agent at temperatures above the boiling temperature of the blowing agent and then dried.

Suitable as melamine/formaldehyde precondensates are specially prepared (see reviews: a) W. Woebcken, Kunststoffhandbuch [Plastics Handbook] volume 10 Duroplaste [Thermosets], Munich, Vienna 1988, b) Encyclopedia of Polymer Science and Technology, 3rd edition, vol. 1, Amino Resins, pp. 340 to 370, 2003, c) Ullmann's Encyclopedia of Industrial Chemistry, 6th edition, vol. 2, Amino Resins, pp. 537 to 565. Weinheim 2003) or commercially available precondensates of the two components, melamine and formaldehyde. The melamine-formaldehyde precondensates generally have a molar ratio of formaldehyde to melamine of 5:1 to 1:3, preferably 3.5:1 to 1.5:1.

A preferred process variant for producing the foam used according to the present invention comprises the stages of:

(1) producing a suspension comprising a melamine/formaldehyde precondensate of the foam to be produced and optionally further added components, (2) foaming the precondensate by heating the suspension from step (1) to a temperature above the boiling temperature of the blowing agent, (3) drying the foam obtained from step (2).

The individual process steps and the various possible variants are described in more detail in WO 2012/059493. For example, alcohols may be additionally used in the production of the melamine/formaldehyde precondensate.

Anionic, cationic, and nonionic surfactants and also mixtures thereof may be used as a dispersant/emulsifier. Such dispersants/emulsifiers may be added for example in amounts of 0.2% to 5% by weight based on the melamine/formaldehyde precondensate.

Both physical and chemical blowing agents may be used in the production of the foam. Blowing agents of this kind are likewise described in WO 2012/059493. Preference is given to adding a physical blowing agent having a boiling point between 0 and 80° C. The blowing agent is present in the mixture preferably in an amount of 0.5% to 60% by weight, more preferably 1% to 40% by weight, in particular 1.5% to 30% by weight, based on the melamine/formaldehyde precondensate.

Curing agents may also be additionally used. These are preferably acidic compounds that catalyze the further condensation of the melamine resin.

If desired, further additives may be additionally used in amounts of 0.1% to 20% by weight, more preferably 0.1% to 10% by weight, based on the melamine/formaldehyde precondensate. Customary additives are dyes, UV stabilizers, antibacterial additives and optionally additional flame retardants or agents to reduce fire gas toxicity or to promote carbonization. Fragrances or optical brighteners or pigments may also be added. Such additives are preferably distributed homogeneously in the foam. A description is likewise given in WO 2012/059493.

For good fire protection, the proportion in the foam of other organic constituents besides the melamine/formaldehyde resin and the polyurethane dispersion should be as low as possible.

For actual manufacturing examples and manufacturing conditions, reference can again be made to WO 2007/023118 and WO 2012/059493.

Impregnation with the at least one particulate phyllosilicate surface-modified with aminosilane and with at least one anionically- and/or nonionically-stabilized polyurethane dispersion and optionally the dispersing agent and the hydrophobizing/oleophobizing agent may be carried out by any suitable method. Suitable methods are described for example in WO 2007/023118.

Production is preferably carried out by a process comprising the following steps:
(a) mixing the at least one particulate phyllosilicate surface-modified with aminosilane with the at least one anionically- and/or nonionically-stabilized polyurethane dispersion and optionally the dispersing agent and the hydrophobizing/oleophobizing agent,
(b) applying the mixture from step (a) to the foam,
(c) optionally subsequently compressing the foam so as to introduce the mixture into the pores of the foam,
(d) drying the foam.

Step (d) here is preferably carried out at temperatures in the range from 40 to 200° C., more preferably 100 to 150° C., until constant weight, depending on the chemical structure and thermal stability of the PU dispersion.

The mixture may be applied to the foam by spreading it onto the foam, soaking the foam with the mixture or by needle injection.

The mixture can be introduced into the pores of the foam by subsequent compression of the foam with the mixture.

In addition, uniform distribution of the mixture in the pores of the foam can be achieved by compressing or foularding.

The spreading of the mixture onto the foam and compression of the foam may be carried out for example as described in EP-A 0 451 535. This is done by feeding the foam between two counter-rotating rollers, with the distance between the rollers being set such that the foam is compressed by this process. The mixture with which the foam is to be impregnated is applied to horizontal rollers positioned side by side, with the result that a pool of liquid forms at the point at which the foam is fed through the rollers. The mixture contained in the pool of liquid is pressed into the foam by the rotational movement of the rollers and the compression of the foam. The mixture coats the foam webs, forming a closed surface once cured.

After application of the mixture and compression of the foam, the foam thus impregnated is preferably dried in a drying oven at a temperature in the range from 40 to 200° C.

In order to further increase the density of the impregnated foam, the foam impregnated in a first step may also undergo the impregnation process multiple times by the same method. This increases the thickness of the layer coating the webs, and thus the density, in each step.

The unimpregnated melamine/formaldehyde foam preferably has a density in the range from 5 to 12 g/l.

It is preferable when the density of the impregnated (and dried) melamine/formaldehyde foam is at least 3 g/l higher than the density of the unimpregnated melamine/formaldehyde foam.

Besides spreading with the substance with which the foam is to be impregnated and subsequent compression, it is also possible to soak the foam with the substance with which it is to be impregnated and then to compress it. Soaking is done for example by drawing the foam through a bath that contains the at least one substance with which the foam is to be impregnated. However, any other method known to those skilled in the art with which the foam can be soaked is also conceivable.

Another possibility for introducing the mixture into the melamine/formaldehyde foam is the injection method. In this method, the mixture is evenly guided through a plurality of injection needles that are arranged parallel to each other perpendicular to a surface and introduced into the foam so that the mixture is distributed as homogeneously as possible in all directions in space in the foam. The excess water can be removed for example by passage through a gap between two counter-rotating rollers.

Besides feeding the foam through a gap between two counter-rotating rollers, it is also possible to apply the pressure required for impregnation by transporting the impregnated foam on a conveyor belt and pressing onto the foam with a roller revolving at the same circumferential speed at which the foam is moving. Pressure can also be applied to the foam by inserting the foam for example into a press in which a stamper presses onto the foam. In this case, however, continuous compression is not possible.

The melamine/formaldehyde foams according to the invention are used for thermal and sound insulation in the construction of buildings, in automobile, ship, and rail vehicle construction, the construction of spacecraft or in the upholstery industry.

The melamine/formaldehyde foams according to the invention are preferably used for insulation against heat and cold and/or sound insulation and for isolation/insulation of buildings and parts of buildings, in particular walls, partitions, roofs, facades, doors, ceilings, and floors, of vehicles of any kind on land, on water, in the air, and in space, whether this be for transporting freight or people, or any such combination in passenger cars, trucks, for example for insulating the engine compartment (such as engine hoods) or passenger compartments, for rail transport in rail cars used for transportation of goods or people, and also in locomotives, in aircraft, for example in the cabin interior, the cockpit or cargo hold, and also in space travel in manned or unmanned flying objects such as spacecraft and orbital gliders, space capsules or satellites, for low-temperature insulation of, for example, cooling units, refrigerators, cold stores, tank systems, and containers for any liquids, especially for oil and gas, and for liquefied petroleum gas for storage and transportation.

Foams according to the invention are particularly suitable for insulating wall and ceiling elements, pipework, and air conditioning ducts in shipbuilding.

Foams according to the invention are also suitable for the production of components that meet the non-combustibility requirements of IMO 2010 FTP code part 1. Laminating on one or both sides with non-flammable coverings made for example from metal or from carbon fiber or glass fiber nonwovens and woven fabrics provides low-density thermoacoustic wall or ceiling elements and also sandwich components.

The invention is elucidated in more detail in the examples that follow.

EXAMPLES

Standards and Measurement Methods Used:
Non-Combustibility Test IMO-2010 FTP Code Part 1

This fire test is used to demonstrate the non-combustibility of materials for uses in the shipbuilding sector in accordance with resolution MSC.307 (88)). The test is performed by heating cylindrical test specimens (H=50 mm, Ø45 mm) to 750° C. in an electrically heated furnace in accordance with DIN EN ISO 1182. The test specimens are classified as "non-combustible" if the average temperature difference of the furnace temperature and the average temperature difference of the surface temperature of the test specimen is not more than 30° C. The average loss in mass must not exceed 50% by weight and the observed average duration of ignition is less than 10 seconds.

Evaluation of Adhesion of the Phyllosilicates to the Melamine/Formaldehyde Foam

To assess the adhesion of the particulate phyllosilicate to the melamine/formaldehyde foam, a cylindrical test specimen having a diameter of 45 mm and a height of 50 mm is produced from the melamine/formaldehyde foam. After applying the phyllosilicate to the foam structure and drying, the cylindrical test specimen is manually pushed onto a dark, solid base without breaking up the foam. Separation of the filler (phyllosilicate) from the foam is evidenced by a powdery coating on the hard surface.

Assessment of Water Absorption Based on DIN EN 1609

The DIN EN 13162 standard defines the absorption of water $W_p$ after brief partial immersion in accordance with EN 1609. The test result must not exceed a water absorption of 1.0 kg/m². In the drip method according to EN 1609, the initial mass $m_0$ of the test specimen of the hydrophobized foam of the invention is determined. The test specimen is then placed in an empty water container and weighted so that it remains partially immersed when water is added. Water is then carefully added to the container until the underside of the test specimen is 10 mm below the water level. After 24 hours, the test specimen is removed. After being left to drip for 10 minutes, the test specimen is reweighed and the mass $m_{24}$ is determined. The water absorption $W_p$ in kilograms per square meter is calculated as the difference between $m_{24}$ and $m_0$ divided by the bottom surface area of the test specimen $A_p$ in square meters.

Evaluation of Thermal Conductivity in Accordance with DIN EN 12667

The thermal conductivity was measured in accordance with DIN EN 12667 "Thermal performance of building materials and products-Determination of thermal resistance by averages of guarded hot plate and heat flow meter methods-Products of high and medium thermal resistance".

Oxygen Index in Accordance with ISO 4589-2

The oxygen index (LOI=limiting oxygen index) is a parameter for describing fire behavior, particularly of plastics. It is the minimum oxygen concentration of an oxygen-nitrogen mixture at which the combustion of a vertically positioned test specimen persists under the test conditions. The lower its oxygen index, the more readily a substance burns.

The ingredients below were used in the examples and comparative examples shown below:
General Manufacturing Procedure:

A melamine/formaldehyde foam was produced as described in WO 2012/059493, comparative example A and in accordance with WO 2009/021963. A corresponding foam is obtainable for example from BASF SE under the name Basotect®.

Applying the Impregnation

Impregnation was carried out by immersing a flat blank of a melamine/formaldehyde foam in a dispersion consisting of phyllosilicate, dispersing agent, polyurethane dispersion, and water. After compressing the foam blank multiple times in the dispersion, it was removed from the dispersion and then dried to constant weigh at 130° C. for about 4 h.

A particulate phyllosilicate surface-modified with aminosilane and having an average particle diameter (based on length) of 1.4 µm was used. The product Translink® 445 obtainable from BASF SE was used. Talc with an average particle size (based on length) of 10 µm was additionally used as a dispersing agent. Basotect® UL from BASF SE was also used as the melamine/formaldehyde foam.

Different dispersions listed in the table below were used as the anionically- and/or nonionically-stabilized polyurethane dispersion. Astacin® Finish PUM TF and Astacin® Finish PUMN TF from BASF SE are anionic polyurethane dispersions commonly used in leather finishing. The adhesive raw materials Emuldur® 381 A (40%) and Emuldur® 360 A (40%) from BASF SE are likewise anionic polyurethane dispersions. The anionic aliphatic polyurethane dispersion Impranil® DLV/1 (40%) from Covestro is commonly used in the production of textile coatings in various fields of application. The corresponding compositions are shown in table 1 below.

TABLE 1

|  | 1 | 2 | 3 | 4 | 5 |
|---|---|---|---|---|---|
| Starting materials (g) |  |  |  |  |  |
| Translink ® 445 | 2.50 | 2.50 | 2.50 | 2.50 | 2.50 |
| Talc 10 µm | 0.25 | 0.25 | 0.25 | 0.25 | 0.25 g |
| Astacin ® Finish PUM TF (40%) | 0.25 |  |  |  |  |
| Astacin ® Finish PUMN TF (37%) |  | 0.27 |  |  |  |
| Emuldur ® 381 A (40%) |  |  | 0.25 |  |  |
| Emuldur ® 360 A (40%) |  |  |  | 0.25 |  |
| Impranil ® DLV/1 (40%) |  |  |  |  | 0.25 |

TABLE 1-continued

|  | 1 | 2 | 3 | 4 | 5 |
|---|---|---|---|---|---|
| Water | 100.00 | 100.00 | 100.00 | 100.00 | 100.00 |
| Basotect ® UL (6 ± 2 g/L) | 0.48 | 0.47 | 0.48 | 0.48 | 0.48 |
| Result after impregnation |  |  |  |  |  |
| Mass (g) | 2.2 | 2.0 | 2.0 | 2.2 | 2.1 |
| Density (g/L) | 27.4 | 25.4 | 25.4 | 27.4 | 26.4 |

In all tests, an improvement in adhesion compared with systems without binder was observed. This was very good for examples 1 and 4, good for example 5, and moderate for examples 2 and 3.

In a further embodiment, foams according to the invention were obtained by impregnating flat blanks of a melamine/formaldehyde foam in a thickness of 50 mm with a dispersion consisting of phyllosilicate, dispersing agent, polyurethane dispersion, and water and then feeding them through a gap between two counter-rotating rollers (foulard, type Mathis HVF 5) and then drying to constant weight at 130° C. The results are shown below in table 2.

TABLE 2

|  | 6 | 7 | 8 | 9 | 10 |
|---|---|---|---|---|---|
| Starting materials (g) |  |  |  |  |  |
| Translink ® 445 | 62.50 | 62.50 | 62.50 | 62.50 | 62.50 |
| Talc 10 μm | 6.25 | 6.25 | 6.25 | 6.25 | 6.25 |
| Emuldur ® 360 A (40%) | 2.50 | 4.46 | 6.25 | 8.03 | 6.25 |
| Water | 2500.00 | 2500.00 | 2500.00 | 2500.00 | 2500.00 |
| Basotect ® UL (6 g/L) | 5.67 | 5.67 | 5.71 | 5.65 | 5.72 |
| Result after impregnation |  |  |  |  |  |
| Mass (g) | 19.1 | 19.3 | 19.2 | 19.5 | 14.9 |
| Density (g/L) | 20.2 | 20.4 | 20.3 | 20.6 | 15.7 |
| Assessment |  |  |  |  |  |
| Adhesion of the phyllosilicates | satisfactory | good passed | very good | very good | very good |
| Non-combustibility test (IMO 2010 FTP code part 1) | passed |  | passed | not passed | not passed |

Formulation 8 shows very good binding of the phyllosilicate and of the dispersing agent in the foam and the requirements of the non-combustibility test in accordance with IMO 2010 FTP code part 1 were met.

In a further embodiment, foams according to the invention were obtained by impregnating flat blanks of a melamine/formaldehyde foam in a thickness of 50 mm with a dispersion consisting of phyllosilicate, polyurethane dispersion, hydrophobizing agent, and water and then feeding them through a gap between two counter-rotating rollers (foulard, type Mathis HVF 5), drying to constant weight at 130° C., and then drying at 170° C. for a further 30 min. The hydrophobizing agent used was Tegosivin HE 328 from Evonik. The results are shown in table 3 below.

|  | 11 |
|---|---|
| Starting materials (g) |  |
| Translink ® 445 | 118.75 |
| Tegosivin HE 328 | 1.25 |
| Emuldur ® 360 A (40%) | 5.00 |
| Water | 2500.00 |
| Basotect ® UL (6 g/L) | 6.16 |
| Result after impregnation |  |
| Mass (g) | 21.7 |
| Density (g/L) | 21.2 |
| Assessment |  |
| Adhesion of the phyllosilicates | good |
| Non-combustibility test (IMO 2010 FTP code part 1) | passed |
| Water absorption (based on DIN EN 1609) | passed |
| Thermal conductivity (mW/m*K, DIN EN 12667) | 32.1 |

Flat blanks of formulation 11 were then laminated with a glass nonwoven (80 kg/m²). For this, fire-protection adhesive 10300 from IGP GmbH was diluted 1:1 with water and applied homogeneously using a spray gun to the upper side of the formulation 11 test specimen plates. The glass nonwoven was then laid on the still-wet surface and weighed down with a weight without compressing the foam excessively. This was dried to constant weight at room temperature. Application of fire-protection adhesive 10300 at an application rate (dry weight) of 400 g/m² achieved good homogeneous adhesion of the glass nonwoven to the formulation 11 foam surface. The thus-laminated component 12 was tested in respect of fire properties and thermal conductivity. The requirements of IMO 2010 FTP code part 1 were met. The thermal conductivity according to DIN EN 12667 is 32.4 mW/m*K.

In similar manner, flat blanks of formulation 11 were laminated on both sides with perforated aluminum foil (surface weight 60 g/m², 16 perforations/cm²). For this, Emuldur 360 A from BASF was diluted with water and applied homogeneously using a spray gun to the upper and lower sides of the formulation 11 test specimen plates. The aluminum foil was then laid on the still-wet surface and weighed down with a small weight without compressing the foam excessively. This was dried to constant weight at room temperature. Application of the binder Emuldur 360 A at an application rate of 35 g/m² achieved very good homogeneous adhesion of the aluminum foil to the surface of the formulation 11 foam. The requirements of IMO 2010 FTP code part 1 were met.

In similar manner, samples were also prepared with the binders Hensotherm 2KS from Rudolf Hensel GmbH and the fire-protection adhesive VP 7470/2 from IGP Chemie GmbH and laminated on both sides with aluminum. Hensotherm 2KS was diluted 1:1 with water and sprayed onto the Basotect, which was then laminated with aluminum foil and dried to constant weight (dry weight of binder 40 g/m²). In the case of fire-protection adhesive VP 7470/2, this was diluted with water and applied to the aluminum foil with a brush. The foil was laid on the Basotect and dried to constant weight with application of gentle pressure (dry weight of binder 130 g/m²), In both cases, good, homogeneous adhesion of the aluminum foil to the surface of the foam was achieved.

BSK 10300 is a solvent-free, non-flammable, single-component water glass adhesive. The A1 adhesive according to DIN 4102-1 consists of a preparation of aqueous alkali metal silicates to which are added inorganic fillers and also additives to improve the rheological properties and separation behavior.

VP7470/2 is a solvent-free, single-component product that can be used in preventive fire protection as a fire-protection adhesive/coating for various materials. VP7470/2 consists of an aqueous plastic dispersion with inorganic additives and water-releasing (halogen-free) flame retardants.

Hensotherm 2KS Indoor is a fire-protection coating for wood that forms an insulating layer, which enables wood and wood materials to be classified as class B1 building materials in accordance with DIN 4102-1.

Another series of tests investigated the influence of the adhesive system on fire behavior. This was done by producing three different systems based on aluminum foil, Basotect, and binding system and then determining the oxygen index in accordance with ISO 4589-2,
- a) The upper side of a Basotect plate was laminated with self-adhesive aluminum foil (thickness 0.08 mm, coated on one side with pressure-sensitive adhesive). Applied to the reverse side was a double-sided adhesive film based on acrylate adhesive. The protective film of the double-sided adhesive film was removed for the subsequent fire test.
- b) The upper side of a Basotect plate was laminated with self-adhesive aluminum foil (thickness 0.08 mm, coated on one side with pressure-sensitive adhesive).

Magnifin® H-5 IV from Albemarle is a high-purity magnesium hydroxide that has been subjected to a special chemical surface treatment with an aminopolysiloxane.

The binders Acronal® Plus 2483 and Acronal0 5041 from BASF SE are aqueous dispersions of a styrene-acrylic ester copolymer. The organofunctionalized silanes Geniosil® GF9 and Geniosil® GF95 from Wacker Chemie AG are used as adhesion promoters in plastics modified with fillers. Acrodur® 950 L from BASF SE is an aqueous solution of a modified polycarboxylic acid with a polyhydric alcohol as a crosslinking component and is used for formaldehyde-free bonding of wood fibers, other natural fibers or finely divided inorganic materials. Lupamin® 9050 from BASF SE is a copolymer of vinylformamide and vinylamine. The fire-protection adhesive BSK 10300 from IGP GmbH consists of a preparation of aqueous alkali metal silicates to which are added inorganic fillers and also additives to improve the rheological properties and separation behavior.

Corresponding compositions are reported in table 3 below.

TABLE 3

| | C1 | C2 | C3 | C4 | C5 | C6 | C7 | C8 |
|---|---|---|---|---|---|---|---|---|
| Starting materials (g) | | | | | | | | |
| Magnifin ® H-5 IV | 2.50 | 2.50 | 2.50 | 2.50 | 2.50 | 2.50 | 2.50 | 2.50 |
| Acronal ® Plus 2483 (50%) | 0.30 | | | | | | | |
| Acronal ® 5041 (52%) | | 0.30 | | | | | | |
| Geniosil ® GF9 | | | 0.30 | | | | | |
| Geniosil ® GF95 | | | | 0.30 | | | | |
| Emuldur ® 360 A (40%) | | | | | 0.30 | | | |
| Acrodur ® 950 L (50%) | | | | | | 0.30 | | |
| Lupamin ® 9050 (18%) | | | | | | | 0.30 | |
| Fire-protection adhesive BSK10300 (66%) | | | | | | | | 0.30 |
| Water | 100.00 | 100.00 | 100.00 | 100.00 | 100.00 | 100.00 | 100.00 | 100.00 |
| Basotect ® UL (6 ± 2 g/L) | 0.49 | 0.49 | 0.48 | 0.48 | 0.49 | 0.49 | 0.50 | 0.48 |
| Result after impregnation | | | | | | | | |
| Mass (g) | 2.8 | 2.9 | 2.5 | 2.2 | 2.9 | 2.9 | 2.7 | 2.9 |
| Density (g/L) | 34.6 | 34.9 | 31.3 | 26.9 | 35.0 | 34.8 | 33.1 | 35.4 |

- c) The upper side of a Basotect plate was sprayed with fire-protection adhesive 10300 (diluted 1:1 with water). The aluminum foil (thickness 0,08 mm without pressure-sensitive adhesive) was then laid on the still-wet surface and weighed down with a weight without compressing the foam excessively. Application of fire-protection adhesive 10300 at an application rate (dry weight) of 400 g/m² achieved good homogeneous adhesion of the aluminum foil to the surface of the Basotect.

The following oxygen indices according to ISO 4589-2 were obtained for the three configurations a) to c):
- a) LOI: 20.2%
- b) LOI: 27.0%
- c) LOI: 30.4%

By using suitable adhesive systems, the oxygen index may be increased and the propensity for combustion thus reduced.

For comparison, impregnations based on magnesium oxide as a particulate filler in combination with various binders were investigated.

The impregnated foams of the comparative examples showed poor binding of the magnesium oxide filler. The filler trickled out of the foam almost completely during the mechanical testing described above.

The invention claimed is:

1. An impregnated melamine/formaldehyde foam having an open-cell foam structure, wherein the impregnated melamine/formaldehyde foam is formed by impregnating an unimpregnated melamine/formaldehyde foam with a composition comprising at least one particulate phyllosilicate surface-modified with aminosilane and at least one anionically- and/or nonionically-stabilized polyurethane dispersion, wherein the composition which is impregnated into the foam structure may be dried.

2. The impregnated melamine/formaldehyde foam according to claim 1, wherein the particulate phyllo silicate surface-modified with amino silane has a mean particle diameter in the range from 0.2 to 10 μm (Z mean, determined by light scattering, Malvern, Fraunhofer diffraction).

3. The impregnated melamine/formaldehyde foam according to claim 1, wherein the at least one particulate phyllosilicate surface-modified with aminosilane is applied to the foam structure in an amount of 50 to 350 parts by weight based on 100 parts by weight of unimpregnated melamine/formaldehyde foam.

4. The impregnated melamine/formaldehyde foam according to claim 1, wherein the at least one anionically- and/or nonionically-stabilized polyurethane dispersion is used in an amount of 0.5% to 10% by weight based on the impregnation dry mass.

5. The impregnated melamine/formaldehyde foam according to claim 1, wherein the unimpregnated melamine/formaldehyde foam has a density in the range from 5 to 12 g/l.

6. The impregnated melamine/formaldehyde foam according to claim 1, wherein the density of the impregnated melamine/formaldehyde foam is at least 3 g/l higher than the density of the unimpregnated melamine/formaldehyde foam.

7. The impregnated melamine/formaldehyde foam according to claim 1, wherein the melamine/formaldehyde foam has a molar ratio of formaldehyde to melamine in the range from 5:1 to 1.3:1.

8. The impregnated melamine/formaldehyde foam according to claim 1, wherein the at least one anionically- and/or nonionically-stabilized polyurethane dispersion is an aqueous dispersion of a polyurethane comprising carbodiimide structural units of the formula —N=C=N—.

9. The impregnated melamine/formaldehyde foam according to claim 8, wherein the carbodiimide structural units of the formula —N=C=N— are introduced into the polyurethane via tetramethylxylylene diisocyanate (TMXDI).

10. The impregnated melamine/formaldehyde foam according to claim 8, wherein the content of carbodiimide structural units of the formula —N=C=N— is 5 to 200 ml/kg based on the polyurethane.

11. The impregnated melamine/formaldehyde foam according to claim 1, wherein the composition additionally comprises hydrophobizing and/or oleophobizing agents and/or dispersing agents.

12. The impregnated melamine/formaldehyde foam according to claim 1, wherein an outer surface thereof is at least partially laminated with flat glass-fiber nonwovens, mineral-fiber nonwovens, carbon-fiber nonwovens, carbon-fiber woven fabrics, glass-fiber woven fabrics, mineral-fiber woven fabrics or metal foils.

13. A process for producing an impregnated melamine/formaldehyde foam according to claim 1, comprising the steps of:
(a) mixing the at least one particulate phyllo silicate surface-modified with aminosilane with the at least one anionically- and/or nonionically-stabilized polyurethane dispersion and optionally the dispersing agent and the hydrophobizing/oleophobizing agent,
(b) applying the mixture from step (a) to the foam,
(c) subsequently impregnating the mixture into the pores of the foam to form an impregnated melamine/formaldehyde foam, optionally by compressing the foam, and
(d) drying the foam.

14. The process according to claim 13, wherein step d) is carried out at temperatures in the range from 40 to 200° C.

* * * * *